(12) United States Patent
Haesendonckx et al.

(10) Patent No.: US 8,758,670 B2
(45) Date of Patent: Jun. 24, 2014

(54) METHOD AND APPARATUS FOR BLOW-MOLDING CONTAINERS

(75) Inventors: Frank Haesendonckx, Hamburg (DE); Karl-Heinz Balkau, Oststeinbek (DE); Matthias Gernhuber, Hamburg (DE)

(73) Assignee: KHS Corpoplast GmbH, Hamburg (DE)

( * ) Notice: Subject to any disclaimer, the term of this patent is extended or adjusted under 35 U.S.C. 154(b) by 214 days.

(21) Appl. No.: 13/129,209

(22) PCT Filed: Sep. 7, 2009

(86) PCT No.: PCT/DE2009/001267
§ 371 (c)(1),
(2), (4) Date: Jun. 27, 2011

(87) PCT Pub. No.: WO2010/054610
PCT Pub. Date: May 20, 2010

(65) Prior Publication Data
US 2011/0260350 A1    Oct. 27, 2011

(30) Foreign Application Priority Data
Nov. 13, 2008    (DE) .......................... 10 2008 057 999

(51) Int. Cl.
B29C 49/78    (2006.01)

(52) U.S. Cl.
USPC .......... 264/535; 264/40.6; 264/523; 425/141; 425/526

(58) Field of Classification Search
None
See application file for complete search history.

(56) References Cited

U.S. PATENT DOCUMENTS

| 4,076,071 | A | | 2/1978 | Rosenkranz et al. |
| 5,011,648 | A | * | 4/1991 | Garver et al. ................. 264/521 |
| 5,346,386 | A | | 9/1994 | Albrecht et al. |
| 5,648,026 | A | | 7/1997 | Weiss |
| 6,171,531 | B1 | * | 1/2001 | Reber et al. .................. 264/40.1 |
| 7,491,358 | B2 | | 2/2009 | Gernhuber et al. |
| 7,787,742 | B2 | | 8/2010 | Dietz et al. |
| 7,887,742 | B2 | * | 2/2011 | Linke et al. ................... 264/519 |

FOREIGN PATENT DOCUMENTS

| DE | 2352926 | | 4/1975 |
| DE | 4212583 | | 10/1993 |
| DE | 4340291 | | 6/1995 |
| DE | 19906438 | | 8/2000 |
| WO | 02087850 | A | 11/2002 |
| WO | 2007110018 | A | 10/2007 |

* cited by examiner

Primary Examiner — Monica Huson
(74) Attorney, Agent, or Firm — Lucas & Mercanti, LLP

(57) ABSTRACT

A method and an apparatus for blow-molding containers are disclosed. A parison made of a thermoplastic material is first subjected to a thermal treatment in the zone of a heating section along a conveying path. The parison is then shaped into the container within a blow mold under the effect of a blowing pressure. Once the container has been blow-molded, a wall thickness is measured on at least one vertical level of the container. A preset value for the wall thickness is fed to a controller as a desired value, and the measured wall thickness is fed thereto as an actual value. The controller presets the quantity of at least one parameter influencing the blowing process in accordance with a difference between the desired value and the actual value. More specifically, the controller presets the quantity of at least one parameter influencing the supply of blowing gas. The quantity of the parameter is preset on the basis of a blowing process simulation model implemented in the controller.

14 Claims, 7 Drawing Sheets

METHOD AND APPARATUS FOR BLOW-MOLDING CONTAINERS

The present application is a 371 of international application PCT/DE2009/001267 filed Sep. 7, 2009, which claims priority of DE 10 2008 057 999.8, filed Nov. 13, 2008, the priority of these applications is hereby claimed and these applications are incorporated herein by reference.

BACKGROUND OF THE INVENTION

The invention concerns a method for blow molding containers, in which a preform made of a thermoplastic material is subjected to thermal conditioning along a conveyance path in a heating line and then molded into a container in a blow mold by the action of blowing pressure; in which, after the container has been blow molded, a wall thickness is measured at at least one height level of the container; in which an automatic control system is supplied with a preassigned value for the wall thickness as the setpoint value and with the measured wall thickness as the actual value; and in which the automatic control system presets a value of at least one parameter that affects the blowing process as a function of the difference between the setpoint value and the actual value.

The invention also concerns a device for blow molding containers made of a thermoplastic material, which has at least one heating line arranged along a preform conveyance path and at least one blowing station with a blow mold, and in which an automatic control system is used, which is connected with at least one sensor for determining a wall thickness of the container, and in which the automatic control system has at least one final control element for presetting the value of a parameter that affects the blowing process.

In container molding by the action of blowing pressure, preforms made of a thermoplastic material, for example, preforms made of PET (polyethylene terephthalate), are fed to different processing stations within a blow-molding machine. A blow-molding machine of this type typically has a heating system and a blowing system, in which the preform, which has first been brought to a desired temperature, is expanded by biaxial orientation to form a container. The expansion is effected by means of compressed air, which is fed into the preform to be expanded. DE-OS 43 40 291 explains the process-engineering sequence in this type of expansion of the preform. The aforementioned introduction of the pressurized gas comprises both the introduction of compressed gas into the developing container bubble and the introduction of compressed gas into the preform at the beginning of the blowing process.

The basic structure of a blowing station for container molding is described in DE-OS 42 12 583. Possible means of bringing the preforms to the desired temperature are explained DE-OS 23 52 926.

Various handling devices can be used to convey the preforms and the blow-molded containers within the blow-molding device. The use of transport mandrels, onto which the preforms are slipped, has proven especially effective. However, the preforms can also be handled with other supporting devices. Other available designs are grippers for handling the preforms and expanding mandrels, which can be inserted in the mouth region of the preform to support the preform.

The handling of containers with the use of transfer wheels is described, for example, in DE-OS 199 06 438 with the transfer wheel arranged between a blowing wheel and a delivery line.

The above-explained handling of the preforms occurs, for one thing, in so-called two-step processes, in which the preforms are first produced by injection molding and temporarily stored and then later conditioned with respect to their temperature and blown into containers. For another, the preforms can be handled in so-called one-step processes, in which the preforms are first produced by injection molding and allowed to solidify sufficiently and are then immediately suitably conditioned with respect to their temperature and then blow molded.

With respect to the blowing stations that are used, various embodiments are known. In the case of blowing stations that are arranged on rotating transport wheels, book-like opening of the mold supports is often encountered. However, it is also possible to use mold supports that can be moved relative to each other or that are supported in a different way. In stationary blowing stations, which are suitable especially for accommodating several cavities for container molding, plates arranged parallel to one another are typically used as mold supports.

Before a heating operation is carried out, the preforms are typically slipped onto transport mandrels, which either convey the preforms through the entire blow-molding machine or merely revolve within the heating system. In the case of vertical heating of the preforms in such a way that the mouths of the preforms are oriented vertically downward, the preforms are usually placed on a sleeve-like mounting element of the transport mandrel. In the case of suspended heating of the preforms, in which the mouths of the preforms are oriented vertically upward, expanding mandrels are usually inserted into the mouths of the preforms to clamp them tightly.

In carrying out container molding by blow molding, an essential task is to achieve a predetermined material distribution in the container wall. An important parameter for predetermining the material distribution that is obtained is the heat distribution realized in the preforms before the blow molding.

The heat distribution is typically realized in such a way that an even temperature level is produced in a circumferential direction of the preforms, while a temperature profile is produced in a longitudinal direction of the preforms. In addition, a suitable temperature profile through the wall of the preform from the outside to the inside is also predetermined. It can basically be assumed that regions of the preform with a lower temperature lead to thicker wall regions of the blow-molded container, while the warmer regions of the preform are stretched to a greater extent during the blow molding operation and thus lead to thinner wall regions of the blow-molded container.

The temperature of the preforms can be measured with so-called pyrometers. Exact wall thicknesses of the blow-molded containers can be measured with so-called wall thickness sensors, which operate, for example, optically or with the use of sound waves.

Other important parameters for controlling the material distribution in the blow-molded containers are the stretching speed, the assignment with respect to time of the stretching operation to the delivery of compressed gas, and the pressure distribution with respect to time in the expansion of the preform to the container. In particular, controlling the actual blowing pressure has been found to be difficult, because between a control valve for presetting the blowing pressure and the preform to be expanded there lies a flow path with variable passage cross section and throttles that affect the flow, and, in addition, the increase in the volume of the preform during the blow molding of the preform into the container causes a reaction on the developing pressure. On the other hand, the insertion of the stretch rod into the preform leads to a reduction of the available volume. Furthermore, there are relatively complex interactions among the individual parameters, and these interactions affect the actual material distribution that develops in the blow-molded container.

Due to the large number of parameters and interactions among the parameters, instead of actual automatic control, is often only possible to realize control based on the consideration of empirically determined and manually preset adjustments. Practically realized automatic controls typically relate to individual parameters without sufficient consideration having been given to the complexity of the blowing process.

SUMMARY OF THE INVENTION

The objective of the present invention is to improve a method of the aforementioned type in such a way that qualitatively high-quality container molding is supported with little mechanical engineering effort and at the same time high throughput rates are achieved.

In accordance with the invention, this objective is achieved in such a way that the value of at least one parameter that affects the supply of blowing gas is preset as a correcting variable by the automatic control system and that the value of the parameter is preset on the basis of a blowing process simulation model implemented in the automatic control system.

A further objective of the present invention is to design a device of the aforementioned type in a way that is conducive to high throughput rates with good product quality despite a simple design.

In accordance with the invention, this objective is achieved by designing the final control element to preset the value of a parameter that affects the supply of blowing gas and that the automatic control system comprises a blowing process simulation model for determining the value of the parameter as a function of a control deviation between the setpoint value and the actual value.

The automatic control of the blowing operation, taking into consideration a parameter that affects the supply of blowing gas and taking into account the interactions of individual influencing factors by the blowing process simulation model, allows qualitatively extremely high-grade container production, since preassigned setpoint values are maintained with low tolerances and interfering effects can be automatically controlled with a short time delay. The simulation model considers especially flow cross sections and flow resistance in the vicinity of the blowing gas supply as well as interactions among the developing pressure, the volume flow of blowing gas, and volume changes occurring as a result of the developing container bubble, the positioning of the stretch rod at a given time and other given influencing factors, for example, the temperature of the preforms, the temperature distribution in the wall of the preforms, and the blow mold temperature. Basically, it is possible to incorporate any other desired influencing factors in the blowing process simulation model.

High contour precision of the blow-molded containers can be achieved by measuring the wall thickness of the containers at several different height levels.

In one embodiment, it is provided that the blowing pressure is automatically controlled as a parameter.

It can also be provided that the volume flow is automatically controlled as a parameter.

Furthermore, it is also possible that in addition to the parameters affecting the supply of blowing gas, the heating temperature is automatically controlled.

Expanded control possibilities are made available by automatically controlling the heating temperature in at least one sectional length of the preform.

It is conducive to an easily comprehensible system structure if the automatic control is carried out in the form of a cascade control system.

In particular, taking dynamic characteristics into consideration, it has been found to be effective to automatically control the temperature in an outer closed-loop control system and the blowing gas parameter in an internal closed-loop control system.

An adaptive automatic control design is supported if the blowing process simulation model acts on the control characteristics of at least one controller.

In another embodiment, it is also possible for the blowing process simulation model to act on the controller input of at least one controller.

BRIEF DESCRIPTION OF THE DRAWING

Specific embodiments of the invention are schematically illustrated in the drawings.

DETAILED DESCRIPTION OF THE INVENTION

Figure 1:
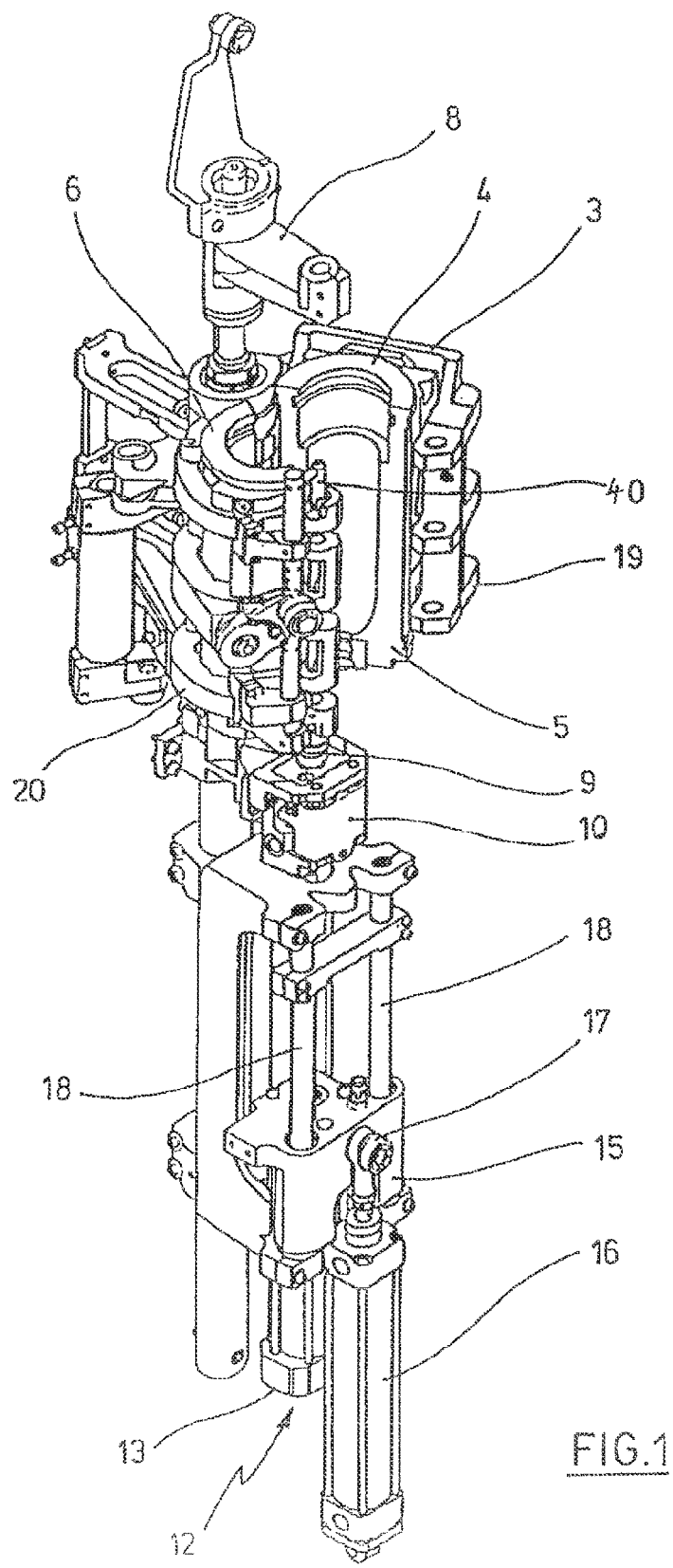
FIG. 1 shows a perspective view of a blowing station for producing containers from preforms.
Figure 2:
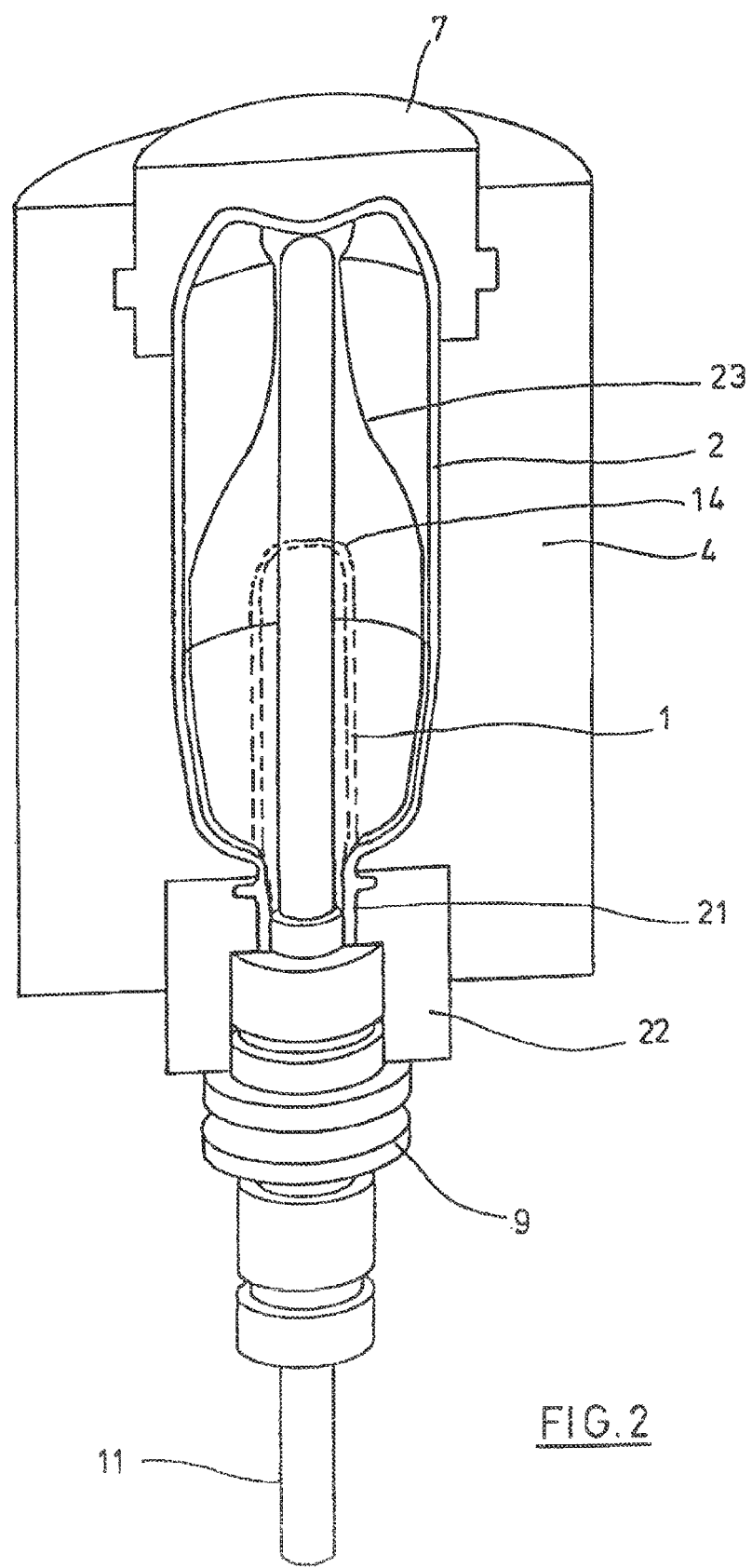
FIG. 2 shows a longitudinal section through a blow mold, in which a preform is stretched and expanded.

FIGS. 1 and 2 show the basic design of a device for molding preforms 1 into containers 2.

The device for molding the container 2 consists essentially of a blowing station 3, which is provided with a blow mold 4, into which a preform 1 can be inserted. The preform 1 can be an injection-molded part made of polyethylene terephthalate. To allow the preform 1 to be inserted into the blow mold 4 and to allow the finished container 2 to be removed, the blow mold 4 consists of mold halves 5, 6 and a base part 7, which can be positioned by a lifting device 8. The preform 1 can be held in place in the area of the blowing station 3 by a transport mandrel 9, which, together with the preform 1, passes through a large number of treatment stations within the device. However, it is also possible to insert the preform 1 directly into the blow mold 4, for example, with grippers or other handling devices.

To allow compressed air to be fed in, a connecting piston 10 is arranged below the transport mandrel 9. It supplies compressed air to the preform 1 and at the same time produces a seal relative to the transport mandrel 9. However, in a modified design; it is also basically possible to use stationary compressed air feed lines.

In this embodiment, the preform 1 is stretched by means of a stretch rod 11, which is positioned by a cylinder 12. In accordance with another embodiment, the stretch rod 11 is mechanically positioned by means of cam segments, which are acted upon by pickup rollers. The use of cam segments advantageous especially when a large number of blowing stations 3 is arranged on a rotating blowing wheel.

In the embodiment illustrated in FIG. 1, the stretching system is designed in such a way that a tandem arrangement of two cylinders 12 is provided. Before the start of the actual stretching operation, the stretch rod 11 is first moved into the area of a base 14 of the preform 1 by a primary cylinder 13. During the stretching operation itself, the primary cylinder 13 with the stretch rod extended, together with a carriage 15 that carries the primary cylinder 13, is positioned by a secondary cylinder 16 or by a cam control mechanism. In particular, it is proposed that the secondary cylinder 16 be used in such a way under cam control that a current stretching position is predetermined by a guide roller 17, which slides along a cam track while the stretching operation is being carried out. The guide roller 17 is pressed against the guide track by the secondary cylinder 16. The carriage 15 slides along two guide elements 18.

After the mold halves 5, 6, which are arranged in the area of supports 19, 20, are closed, the supports 19, 20 are locked relative to each other by means of a locking mechanism 20.

To adapt to different shapes of a mouth section 21 of the preform 1, provision is made for the use of separate threaded inserts 22 in the area of the blow mold 4, as shown in FIG. 2.

In addition to the blow-molded container 2, FIG. 2 shows the preform 1, which is drawn with broken lines, and also shows schematically a container bubble 23 in the process of development.

Figure 3:
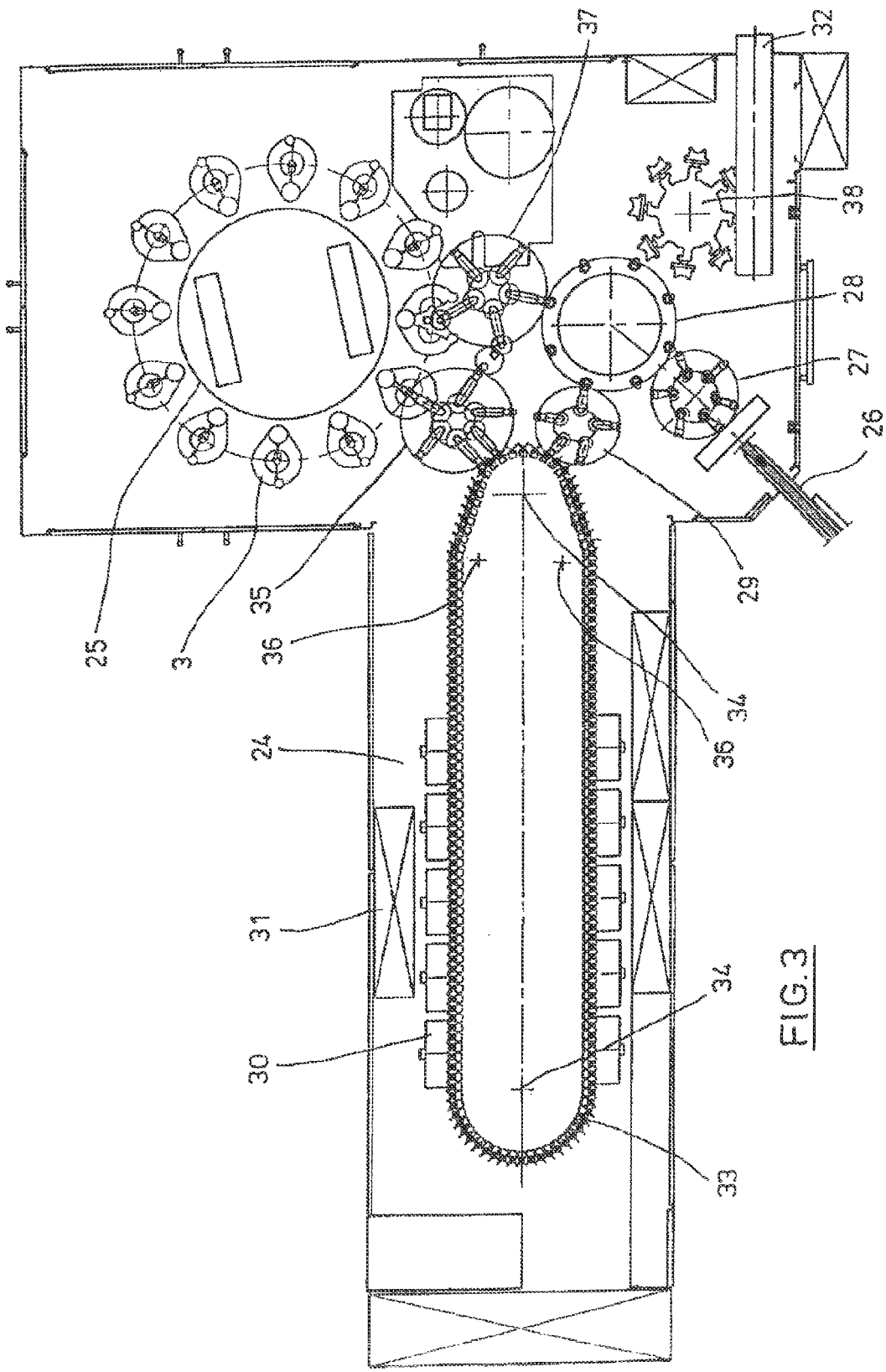
FIG. 3 is a drawing that illustrates a basic design of a device for blow molding containers.

FIG. 3 shows the basic design of a blow-molding machine, which has a heating line 24 and a rotating blowing wheel 25. Starting from a preform feeding device 26, the preforms 1 are conveyed to the area of the heating line 24 by transfer wheels 27, 28, 29. Heating elements 30 and fans 31 are arranged along the heating line 24 to bring the preforms 1 to the desired temperature. After sufficient heat treatment of the preforms 1, they are transferred to the blowing wheel 25, where the blowing stations 3 are located. The finished blow-molded containers 2 are fed to a delivery line 32 by additional transfer wheels.

To make it possible for a preform 1 to be blow molded into a container 2 in such a way that the container 2 has material properties that ensure a long shelf life of the foods, especially beverages, with which the container 2 is to be filled, specific process steps must be followed during the heating and orientation of the preforms 1. In addition, advantageous effects can be realized by following specific dimensioning specifications.

Various plastics can be used as the thermoplastic material. For example, PET, PEN, or PP can be used.

The preform 1 is expanded during the orientation process by feeding compressed air into it. The operation of supplying compressed air is divided into a preblowing phase, in which gas, for example, compressed air, is supplied at a low pressure level, and a subsequent main blowing phase, in which gas is supplied at a higher pressure level. During the preblowing phase, compressed air with a pressure in the range of 10 bars to 25 bars is typically used, and during the main blowing phase, compressed air with a pressure in the range of 25 bars to 40 bars is supplied.

FIG. 3 also shows that in the illustrated embodiment, the heating line 24 consists of a large number of revolving transport elements 33, which are strung together like a chain and are moved along by guide wheels 34. In particular, it is proposed that an essentially rectangular basic contour be set up by the chain-like arrangement. In the illustrated embodiment, a single, relatively large-sized guide wheel 34 is used in the area of the extension of the heating line 24 facing the transfer wheel 29 and a feed wheel 35, and two relatively small-sized guide wheels 36 are used in the area of adjacent deflections. In principle, however, any other types of guides are also conceivable.

To allow the closest possible arrangement of the transfer wheel 29 and the feed wheel 35 relative to each other, the illustrated arrangement is found to be especially effective, since three guide wheels 34, 36 are positioned in the area of the corresponding extension of the heating line 24, namely, the smaller guide wheels 36 in the area of the transition to the linear stretches of the heating line 24 and the larger guide wheel 34 in the immediate area of transfer to the transfer wheel 29 and to the feed wheel 35. As an alternative to the use of chain-like transport elements 33, it is also possible, for example, to use a rotating heating wheel.

After the blow molding of the containers 2 has been completed, the containers 2 are carried out of the area of the blowing stations 3 by an extraction wheel 37 and conveyed to the delivery line 32 by the transfer wheel 28 and a delivery wheel 38.

Figure 4:
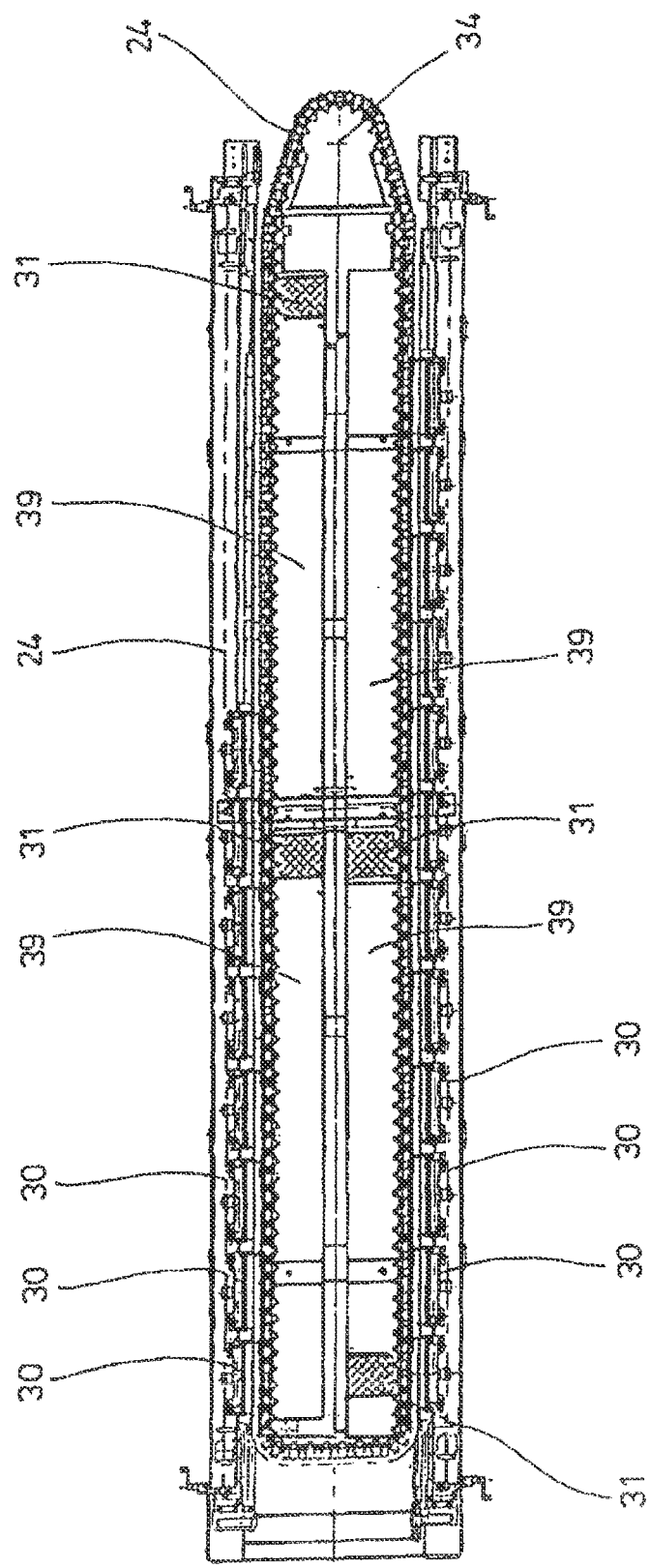
FIG. 4 shows a modified heating line with increased heating capacity.

In the modified heating line 24 illustrated in FIG. 4, a larger number of preforms 1 can be heated per unit time due to the larger number of heating elements 30. The fans 31 in this case feed cooling air into the area of cooling air ducts 39, which lie opposite the associated heating elements 30 and deliver the cooling air through discharge ports, A direction of flow of the cooling air essentially transverse to the direction of conveyance of the preforms 1 is realized by the arrangement of the discharge directions. The surfaces of the cooling air ducts 39 opposite the heating elements 30 can provide reflectors for the thermal radiation. It is also possible to realize cooling of the heating elements 30 by the delivered cooling air.

Figure 5:
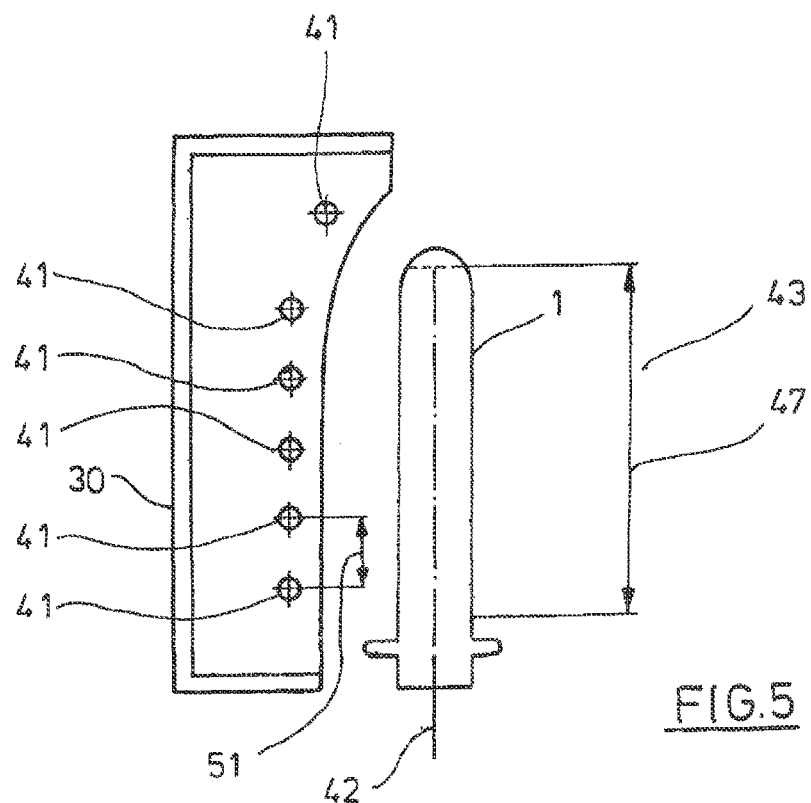
FIG. 5 shows a cross section through a heating element with a plurality of radiant heaters arranged one above the other and an associated preform.

FIG. 5 is a schematic drawing of a heating element 30 that is provided with a plurality of radiant heaters 41 arranged one above the other. With the use of the radiant heaters 41, it is possible to produce a predetermined temperature profile in the direction of a longitudinal axis 42 of the preform 1. When a stretching operation is being carried out, a stretch region 43 of the preform 1 is essentially subjected to a bilateral orientation.

Figure 6:
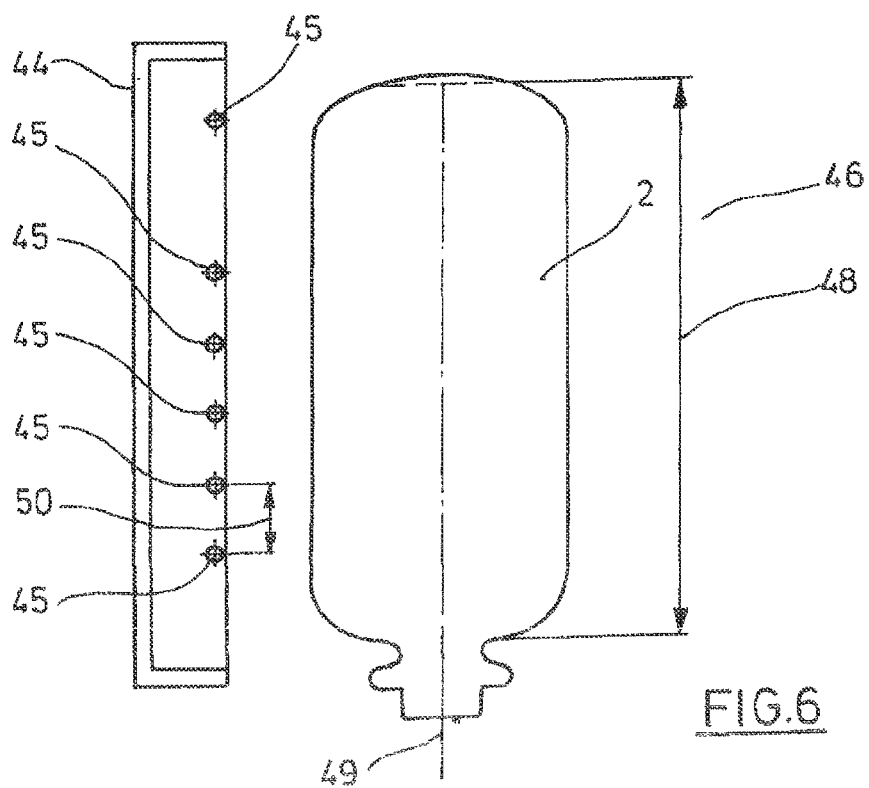
FIG. 6 shows a cross section through a sensor system for measuring wall thicknesses of a blow-molded container.

FIG. 6 is a schematic drawing of a measuring device 44 with a plurality of sensors 45 arranged one above the other for detecting a wall thickness of the container 2. The stretch region 43 of the preform 1 was shaped into an orientation region 46 of the container 2 as a result of the stretching and blowing operation. The stretch region 43 of the preform 1 has an initial length 47, and the orientation region 46 of the container 2 has a product length 48. The quotient of the product length 48 and the initial length 47 represents the realized stretch factor.

The container 2 has a longitudinal axis 49, and the sensors 45 are arranged one after the other in the direction of this longitudinal axis 49. The distance 50 between the sensors 45 is obtained as the distance 51 between the radiant heaters multiplied by the stretch factor.

Figure 7:
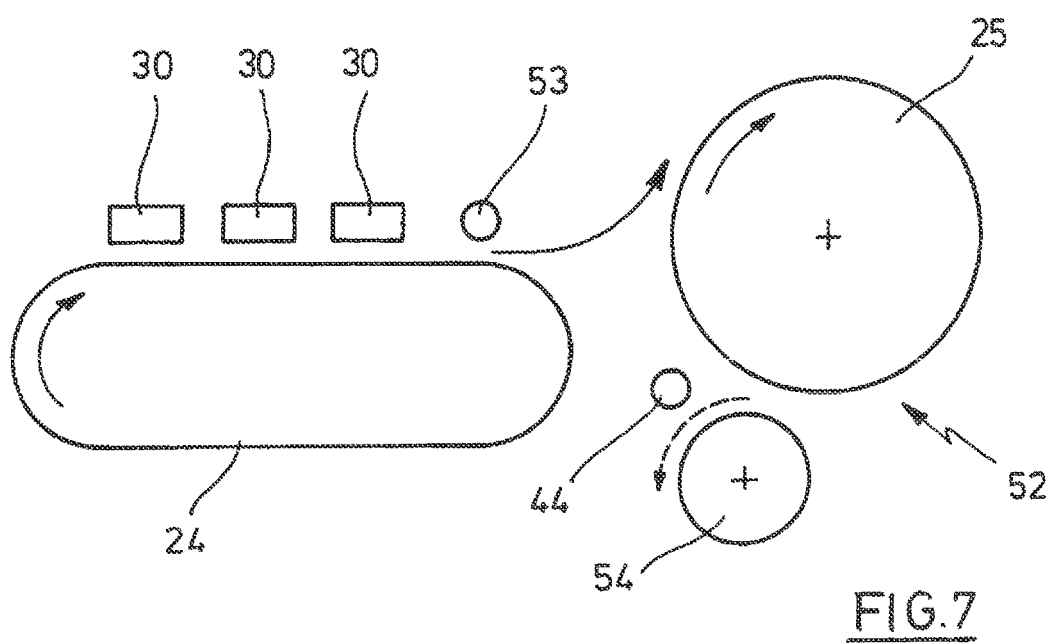
FIG. 7 shows a schematic drawing of a blow-molding machine with a heating line, blowing wheel, pyrometer, and wall thickness sensor.

FIG. 7 is a schematic drawing of a blow-molding machine 52 with a greatly simplified and highly schematic configuration compared to the drawing in FIG. 3. The drawing shows that a temperature sensor 53 for detecting a temperature of the preforms 1 is arranged near the heating line 24 downstream of the heating elements 30 in the direction of conveyance of the preforms 1. It is advantageous for the temperature sensor 53 to be arranged as closely as possible to the blowing wheel 25 to allow temperature detection after thermal equalization processes have taken place within the wall of the preforms 1. A pyrometer is an example of a temperature sensor 53 that can be used. In particular, it is possible to arrange several temperature sensors 53 one above the other in the direction of the longitudinal axis 42 of the preforms 1 in order to determine a temperature profile of the preforms 1. It has been found to be especially advantageous to position a plurality of temperature sensors 53 at the various height levels of the radiant heaters 41 in order to be able to carry out direct automatic control of the individual radiant heaters 41.

FIG. 7 also shows the arrangement of the measuring device 44 for determining the wall thickness of the containers 2. For example, the measuring device 44 can be arranged in the vicinity of an extraction device 54, which carries the blow-molded containers 2 away from the area of the blowing wheel 25.

Figure 8:
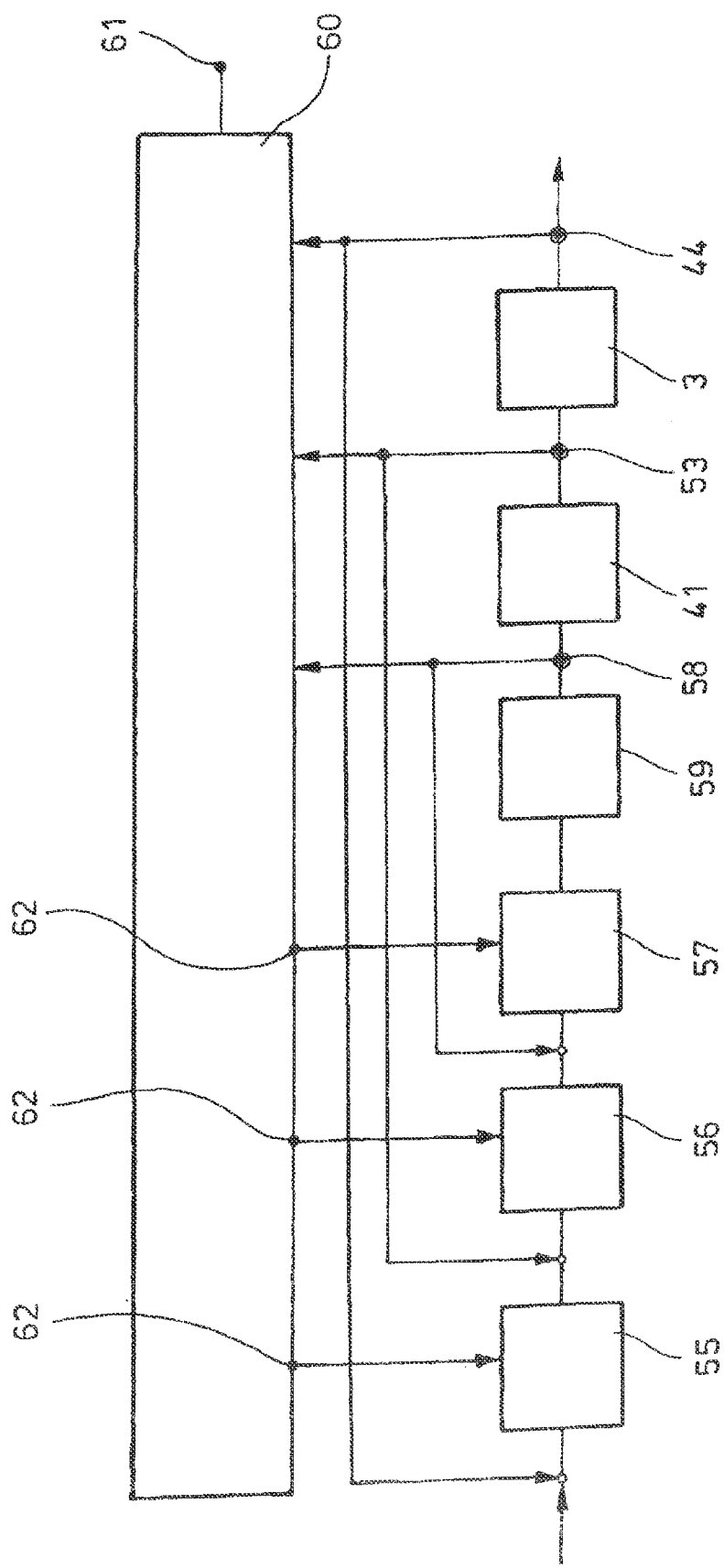
FIG. 8 shows a schematic drawing of an automatic control system design for automatically controlling the temperature of the preform and the wall thickness of the blow-molded containers.

FIG. 8 is a schematic drawing of an automatic control system for the heating elements 30 and radiant heaters 41 in an outer closed-loop control system and for one or more parameters related to the delivery of blowing gas in an inner closed-loop control system. The automatic control system is designed as a cascade control system. An outer closed-loop control system detects the wall thickness 2 of the container 2 at a predetermined height level by means of the measuring device 44 downstream of the blowing station 3 and supplies this actual value to the input of a wall thickness controller 55. The direct input value for the wall thickness controller 55 is the control deviation between a preset wall thickness and the actual wall thickness determined by measurement. An output value of the wall thickness controller 55 provides the setpoint value for an inner temperature closed-loop control system.

The difference between the output value of the wall thickness controller 55 and a temperature value of the preform 1 detected by the temperature sensor 53 at a predetermined height level is supplied to a temperature controller 56 as a direct reference value. An automatic control system of the type illustrated in FIG. 8 is typically assigned to each of the radiant heaters 41.

The innermost and thus fastest closed-loop control system of the cascade control system shown in FIG. 8 includes one or more blowing gas controllers 57. The blowing gas controller 57 can be designed, for example, to automatically control the pressure and/or the volume flow of the blowing gas. A control deviation between an actual value supplied by a sensor 58 and the given blowing gas parameter that is being automatically controlled, which is obtained as the output value of an associated controlled system 59, is supplied to the blowing gas controller 57 as an actual value.

It is advantageous if at least one of the controllers 55, 56, 57 is designed with integral control action in order to avoid control deviations. In accordance with another automatic control variant, the automatic control system takes into consideration lag time behavior of the automatic control system on the basis of the conveyance distances of the preforms 1 and containers 2. In this regard, it is taken into consideration that there is a known delay between a change in a correcting variable and a change in the output variable, which depends on the conveyance speed.

As an alternative to the realization of the automatic control system as a cascade control system of the type illustrated in FIG. 8, the automatic control system can be realized with any other desired automatic control structure. In the case of cascade types of automatic control, it has been found to be effective to automatically control rapidly variable process parameters in the inner closed-loop control systems and slowly variable process parameters in the outer closed-loop control systems.

At least one of the measured values delivered by the sensors 44, 53, 58 is supplied to a process model 60. In addition, the process model 60 has one or more sensor inputs 61 that make it possible to consider additional measurement information regarding the blowing process. The process model 60 also has one or more model outputs 62 that make it possible to affect the automatic control behavior. In one embodiment, the control characteristics of at least one of the controllers 55, 56, 57 are varied via the model output 62. In another embodiment, it is contemplated, alternatively or additionally, that the input value of at least one of the controllers 55, 56, 57 be influenced by the model output or outputs 62. This influence can be brought about, for example, in addition to the influence brought about by the sensors 44, 53, 58. It is also possible to replace at least one of the signals of the sensors 44, 53, 58 by a value available at the model output 62. The process model 60 forms a simulation model.

The process model 60 makes it possible to take into account complex relationships among the individual process parameters during the execution of the automatic control. In particular, it is possible to take delays, lag times and nonlinearities into account. In addition, the process model 60 makes it possible for the automatic control to incorporate process variables that elude direction measurement or that can be measured only with great effort.

The container production can be automatically controlled, for example, on the basis of a predetermined pressure development for the blowing gas. If a comparison of the measured values with the values generated by the simulation model reveals deviations in at least one of the measured parameters, then, for example, the starting point for supplying the preblowing pressure can be varied for each of the production cycles, and/or it is possible to increase or decrease the speed of the stretching process in a suitable way. This can be done especially by presetting the given rate of insertion of the stretch rod into the preform 1 to be stretched.

The invention claimed is:

1. A method for blow molding containers, comprising the steps of: subjecting a preform made of a thermoplastic material to thermal conditioning along a conveyance path in a heating line; molding the preform into a container in a blow mold by the action of blowing pressure; measuring a wall thickness, after the container has been blow molded, at at least one height level of the container; supplying a control system with a preassigned value for the wall thickness as a setpoint value and with the measured wall thickness as an actual value; and presetting, using the control system, a value of at least one parameter that affects the blowing process as a function of a difference between the setpoint value and the actual value, wherein the value of at least one parameter that affects a supply of blowing gas is preset as a correcting variable by the control system and the presetting of the value of the parameter is based on a blowing process simulation model implemented in the control system, further including, in addition to the parameters affecting the supply of blowing gas, controlling heating temperature, carrying out the control as a cascade control, and controlling the temperature in an outer closed-loop and controlling the blowing gas parameter in an inner closed-loop.

2. The method in accordance with claim 1, wherein the measuring step includes measuring the wall thickness of the container at several different height levels.

3. The method in accordance with claim 1, including controlling blowing pressure as the parameter.

4. The method in accordance with claim 1, including controlling volume flow of gas as the parameter.

5. The method in accordance with claim 1, including controlling the heating temperature in at least one sectional length of the preform.

6. The method in accordance with claim 1, wherein the blowing process simulation model acts on control characteristics of at least one controller.

7. The method in accordance with claim 1, wherein the blowing process simulation model acts on a controller input of at least one controller.

8. A device for blow molding containers made of a thermoplastic material, comprising: at least one heating line arranged along a preform conveyance path; at least one blowing station with a blow mold; and a control system connected with at least one sensor for determining a wall thickness of the container, the control system having at least one final control element for presetting a value of a parameter that affects the blowing process, wherein the final control element is operative to preset the value of a parameter that affects a supply of blowing gas, the control system including a blowing process simulation model for determining the value of the parameter as a function of a control deviation between a setpoint value and an actual value, wherein the control system controls the parameters affecting the supply of blowing gas, as well as heating temperature for the preforms, wherein the control system is a cascade control system that has an inner control loop for controlling the parameter that affects the supply of blowing gas and an outer control loop for controlling the temperature during the heating of the preforms.

9. The device in accordance with claim 8, wherein several sensors are arranged at different height levels relative to one another.

10. The device in accordance with claim 8, wherein the control system is designed for pressure control.

11. The device in accordance with claim 8, wherein the control system is designed for control of volume flow.

12. The device in accordance with claim 8, wherein the control system generates a temperature profile that extends a longitudinal direction of the preform.

13. The device in accordance with claim 8, wherein the simulation model has as least one output for influencing at least one controller characteristic.

14. The device in accordance with claim 8, wherein the simulation model has as least one output for influencing at least one controller input.

* * * * *